(12) United States Patent
Dostert et al.

(10) Patent No.: US 7,552,153 B2
(45) Date of Patent: Jun. 23, 2009

(54) VIRTUAL MACHINE MONITORING USING SHARED MEMORY

(75) Inventors: Jan Dostert, Nussloch (DE); Christian Fleischer, Mannheim (DE); Frank Kilian, Mannheim (DE); Randolf Werner, Wiesloch-Baiertal (DE)

(73) Assignee: SAP AG, Woldorf (DE)

( * ) Notice: Subject to any disclaimer, the term of this patent is extended or adjusted under 35 U.S.C. 154(b) by 668 days.

(21) Appl. No.: 11/024,393

(22) Filed: Dec. 28, 2004

(65) Prior Publication Data

US 2006/0143595 A1 Jun. 29, 2006

(51) Int. Cl.
*G06F 17/30* (2006.01)
(52) U.S. Cl. .................. 707/206; 707/200; 707/205
(58) Field of Classification Search .................. None
See application file for complete search history.

(56) References Cited

U.S. PATENT DOCUMENTS

| | | | |
|---|---|---|---|
| 5,331,318 A | 7/1994 | Montgomery | |
| 5,553,242 A | 9/1996 | Russell et al. | |
| 5,566,302 A | 10/1996 | Khalidi et al. | |
| 5,566,315 A | 10/1996 | Milillo et al. | |
| 5,617,570 A | 4/1997 | Russell et al. | |
| 5,682,328 A | 10/1997 | Roeber et al. | |
| 5,692,193 A | 11/1997 | Jagannathan et al. | |
| 5,710,909 A | 1/1998 | Brown et al. | |
| 5,745,778 A | 4/1998 | Alfieri | |
| 5,905,868 A | 5/1999 | Baghai et al. | |
| 5,909,540 A * | 6/1999 | Carter et al. | 714/4 |
| 5,926,834 A | 7/1999 | Carlson et al. | |
| 5,944,781 A | 8/1999 | Murray | |
| 5,951,643 A | 9/1999 | Shelton et al. | |
| 5,961,584 A | 10/1999 | Wolf | |
| 5,974,566 A | 10/1999 | Ault et al. | |
| 6,038,571 A | 3/2000 | Numajiri et al. | |
| 6,065,006 A | 5/2000 | deCarmo et al. | |
| 6,092,171 A | 7/2000 | Relph | |
| 6,115,712 A | 9/2000 | Islam et al. | |
| 6,115,721 A | 9/2000 | Nagy | |
| 6,167,449 A | 12/2000 | Arnold et al. | |
| 6,199,179 B1 | 3/2001 | Kauffman et al. | |
| 6,216,212 B1 | 4/2001 | Challenger et al. | |
| 6,256,712 B1 | 7/2001 | Challenger et al. | |

(Continued)

FOREIGN PATENT DOCUMENTS

EP 0459931 12/1991

(Continued)

OTHER PUBLICATIONS

"OA Mailed Jan. 7, 2008 for U.S. Appl. No. 11/013,277", filed Jan 7, 2008, Whole Document.

(Continued)

*Primary Examiner*—Baoquoc N To
(74) *Attorney, Agent, or Firm*—Blakely Sokoloff Taylor & Zafman

(57) ABSTRACT

A system and method to monitor a virtual machine VM. The VM executes one or more applications. During executing of the one or more applications, local objects are created and stored within an internal heap maintained by the VM. Status data of the internal heap is published to monitoring memory external to the VM.

16 Claims, 7 Drawing Sheets

U.S. PATENT DOCUMENTS

| | | | |
|---|---|---|---|
| 6,272,598 B1 | 8/2001 | Arlitt et al. |
| 6,295,582 B1 | 9/2001 | Spencer |
| 6,330,709 B1 | 12/2001 | Maynard et al. |
| 6,336,170 B1 | 1/2002 | Dean et al. |
| 6,349,344 B1 | 2/2002 | Sauntry et al. |
| 6,356,529 B1 | 3/2002 | Zarom |
| 6,356,946 B1 | 3/2002 | Clegg et al. |
| 6,385,643 B1 | 5/2002 | Jacobs et al. |
| 6,412,045 B1 | 6/2002 | DeKoning et al. |
| 6,415,364 B1 | 7/2002 | Bauman et al. |
| 6,438,560 B1 * | 8/2002 | Loen ............... 707/103 R |
| 6,438,654 B1 | 8/2002 | Elko et al. |
| 6,467,052 B1 | 10/2002 | Kaler et al. |
| 6,519,594 B1 | 2/2003 | Li |
| 6,587,937 B1 | 7/2003 | Jensen et al. |
| 6,591,347 B2 | 7/2003 | Tischler et al. |
| 6,615,253 B1 | 9/2003 | Bowman-Amuah |
| 6,640,244 B1 | 10/2003 | Bowman-Amuah |
| 6,651,080 B1 | 11/2003 | Liang et al. |
| 6,687,702 B2 | 2/2004 | Vaitheeswaran et al. |
| 6,738,977 B1 | 5/2004 | Berry et al. |
| 6,760,911 B1 | 7/2004 | Ye |
| 6,766,419 B1 | 7/2004 | Zahir et al. |
| 6,769,022 B1 | 7/2004 | DeKoning et al. |
| 6,772,409 B1 | 8/2004 | Chawla et al. |
| 6,795,856 B1 | 9/2004 | Bunch |
| 6,879,995 B1 | 4/2005 | Chinta et al. |
| 6,970,925 B1 | 11/2005 | Springmeyer et al. |
| 7,003,770 B1 | 2/2006 | Pang et al. |
| 7,024,512 B1 | 4/2006 | Franaszek et al. |
| 7,089,566 B1 | 8/2006 | Johnson |
| 7,111,300 B1 | 9/2006 | Salas et al. |
| 7,124,170 B1 * | 10/2006 | Sibert ............... 709/216 |
| 7,127,472 B1 | 10/2006 | Enokida et al. |
| 7,149,741 B2 | 12/2006 | Burkey et al. |
| 7,155,512 B2 | 12/2006 | Lean et al. |
| 7,165,239 B2 | 1/2007 | Hejlsberg et al. |
| 7,191,170 B2 | 3/2007 | Ganguly et al. |
| 7,194,761 B1 | 3/2007 | Champagne |
| 7,237,140 B2 * | 6/2007 | Nakamura et al. ............... 714/4 |
| 7,246,167 B2 | 7/2007 | Kalmuk et al. |
| 7,296,267 B2 | 11/2007 | Cota-Robles et al. |
| 7,302,423 B2 | 11/2007 | De Bellis |
| 7,418,560 B2 | 8/2008 | Wintergerst |
| 2001/0029520 A1 | 10/2001 | Miyazaki et al. |
| 2002/0046325 A1 | 4/2002 | Cai et al. |
| 2002/0052914 A1 | 5/2002 | Zalewski et al. |
| 2002/0073283 A1 | 6/2002 | Lewis et al. |
| 2002/0078060 A1 | 6/2002 | Garst et al. |
| 2002/0083118 A1 | 6/2002 | Sim |
| 2002/0083166 A1 | 6/2002 | Dugan et al. |
| 2002/0093487 A1 | 7/2002 | Rosenberg |
| 2002/0147888 A1 | 10/2002 | Trevathan |
| 2002/0169926 A1 | 11/2002 | Pinckney et al. |
| 2002/0174097 A1 | 11/2002 | Rusch et al. |
| 2002/0181307 A1 | 12/2002 | Fifield et al. |
| 2003/0009533 A1 | 1/2003 | Shuster |
| 2003/0014521 A1 | 1/2003 | Elson et al. |
| 2003/0014552 A1 | 1/2003 | Vaitheeswaran et al. |
| 2003/0023827 A1 | 1/2003 | Palanca et al. |
| 2003/0028671 A1 | 2/2003 | Mehta et al. |
| 2003/0037178 A1 | 2/2003 | Vessey et al. |
| 2003/0084248 A1 | 5/2003 | Gaither et al. |
| 2003/0084251 A1 | 5/2003 | Gaither et al. |
| 2003/0088604 A1 | 5/2003 | Kuck et al. |
| 2003/0093420 A1 | 5/2003 | Ramme |
| 2003/0093487 A1 | 5/2003 | Czajkowski et al. |
| 2003/0097360 A1 | 5/2003 | McGuire et al. |
| 2003/0105887 A1 | 6/2003 | Cox et al. |
| 2003/0115190 A1 | 6/2003 | Soderstrom et al. |
| 2003/0131010 A1 | 7/2003 | Redpath |
| 2003/0131286 A1 | 7/2003 | Kaler et al. |
| 2003/0177382 A1 | 9/2003 | Ofek et al. |
| 2003/0191795 A1 | 10/2003 | Bernardin et al. |
| 2003/0196136 A1 | 10/2003 | Haynes et al. |
| 2003/0208563 A1 | 11/2003 | Acree et al. |
| 2003/0212654 A1 | 11/2003 | Harper et al. |
| 2003/0229760 A1 | 12/2003 | Doyle et al. |
| 2004/0024610 A1 | 2/2004 | Fradkov et al. |
| 2004/0024881 A1 | 2/2004 | Elving et al. |
| 2004/0024971 A1 | 2/2004 | Bogin et al. |
| 2004/0045014 A1 | 3/2004 | Radhakrishnan |
| 2004/0117441 A1 | 6/2004 | Liu et al. |
| 2004/0128370 A1 | 7/2004 | Kortright |
| 2004/0168029 A1 | 8/2004 | Civlin |
| 2004/0181537 A1 | 9/2004 | Chawla et al. |
| 2004/0187140 A1 | 9/2004 | Aigner et al. |
| 2004/0205299 A1 | 10/2004 | Bearden |
| 2004/0215703 A1 | 10/2004 | Song et al. |
| 2004/0215883 A1 | 10/2004 | Bamford et al. |
| 2005/0021917 A1 | 1/2005 | Mathur et al. |
| 2005/0027943 A1 | 2/2005 | Steere et al. |
| 2005/0044301 A1 | 2/2005 | Vasilevsky et al. |
| 2005/0055686 A1 | 3/2005 | Buban et al. |
| 2005/0060704 A1 | 3/2005 | Bulson et al. |
| 2005/0071459 A1 | 3/2005 | Costa-Requena et al. |
| 2005/0086656 A1 | 4/2005 | Whitlock et al. |
| 2005/0086662 A1 | 4/2005 | Monnie et al. |
| 2005/0125503 A1 | 6/2005 | Iyengar et al. |
| 2005/0138193 A1 | 6/2005 | Encarnacion et al. |
| 2005/0160396 A1 | 7/2005 | Chadzynski |
| 2005/0180429 A1 | 8/2005 | Ghahremani et al. |
| 2005/0198199 A1 | 9/2005 | Dowling |
| 2005/0216502 A1 | 9/2005 | Kaura et al. |
| 2005/0262181 A1 | 11/2005 | Schmidt et al. |
| 2005/0262512 A1 | 11/2005 | Schmidt et al. |
| 2005/0268294 A1 | 12/2005 | Petev et al. |
| 2005/0278274 A1 | 12/2005 | Kovachka-Dimitrova et al. |
| 2005/0278346 A1 | 12/2005 | Shang et al. |
| 2006/0053112 A1 | 3/2006 | Chitkara et al. |
| 2006/0059453 A1 | 3/2006 | Kuck et al. |
| 2006/0064545 A1 | 3/2006 | Wintergerst |
| 2006/0064549 A1 | 3/2006 | Wintergerst |
| 2006/0070051 A1 | 3/2006 | Kuck et al. |
| 2006/0092165 A1 | 5/2006 | Abdalla et al. |
| 2006/0094351 A1 | 5/2006 | Nowak et al. |
| 2006/0143389 A1 | 6/2006 | Kilian et al. |
| 2006/0143392 A1 | 6/2006 | Petev et al. |
| 2006/0150197 A1 | 7/2006 | Werner |
| 2006/0159197 A1 | 7/2006 | Kraut et al. |
| 2006/0167980 A1 | 7/2006 | Werner |
| 2006/0168646 A1 | 7/2006 | Werner |
| 2006/0168846 A1 | 8/2006 | Juan |
| 2006/0206856 A1 | 9/2006 | Breeden et al. |
| 2006/0253558 A1 | 11/2006 | Acree et al. |
| 2006/0294253 A1 | 12/2006 | Linderman |
| 2007/0050768 A1 | 3/2007 | Brown et al. |
| 2007/0266305 A1 | 11/2007 | Cong et al. |

FOREIGN PATENT DOCUMENTS

| | | |
|---|---|---|
| GB | 2365553 | 2/2002 |
| WO | WO-00/23898 | 4/2000 |
| WO | WO-03/073204 | 9/2003 |

OTHER PUBLICATIONS

"OA Mailed Mar. 12, 2007 for U.S. Appl. No. 11/013,277", filed Mar. 12, 2007, Whole Document.

"FOA Mailed Aug. 17, 2007 for U.S. Appl. No. 11/013,278", filed Aug. 17, 2007, Whole Document.

"OA Mailed Feb. 5, 2008 for U.S. Appl. No. 11/013,278", filed Feb. 5, 2008, Whole Document.

"OA Mailed Mar. 16, 2007 for U.S. Appl. No. 11/013,278", filed Mar. 16, 2007, Whole Document.

"FOA Mailed Aug. 28, 2007 for U.S. Appl. No. 11/012,803", filed Aug. 28, 2007, Whole Document.

"OA Mailed Jan. 24, 2008 for U.S. Appl. No. 11/012,803", filed Jan. 24, 2008, Whole Document.

"OA Mailed Mar. 16, 2007 for U.S. Appl. No. 11/012,803", filed Mar. 16, 2007, Whole Document.

"OA Mailed Jan. 24, 2008 for U.S. Appl. No. 11/024,393", filed Jan. 24, 2008, Whole Document.

"OA Mailed Feb. 21, 2008 for U.S. Appl. No. 11/027,812", filed Feb. 21, 2008, Whole Documents.

"OA Mailed Apr. 4, 2008 For U.S. Appl. No. 11/118,259", filed Apr. 4, 2008, Whole Document.

"OA Mailed Jun. 11, 2007 for U.S. Appl. No. 11/118,259", filed Jun. 11, 2007, Whole Document.

USPTO, "OA Mailed Jun. 27, 2008 for U.S. Appl. No. 11/024,391", filed Jun. 27, 2008, Whole Document.

USPTO, "OA Mailed Apr. 4, 2008 for U.S. Appl. No. 11/024,392", filed Apr. 4, 2008, Whole Document.

"EP 05027361, European Search Report", (Mar. 28, 2006), Whole Document.

"Failover for Clustered RMI-P4 Remote Objects", SAP Library, http://help.sap.com/saphelp_nw04/helpdata/en/f6/4ef11ab3a52f408aa8a133f33d6cf1/cont, (Nov. 2004), 1-3.

"Failover for Enterprise Beans", SAP Library, http://help.sap.com/saphelp_nw04/helpdata/en/8f/d6e45953a494499ea1b79ab16321d2/cont, (Nov. 2004), 1-3.

"Failover System", SAP Library, http://help.sap.com/saphelp_nw04/helpdata/en/d7/57af0cce55143be5de3a6e4911186.cont, (Nov. 2004), 2.

"SAP Beefs Up Java Support Capabilities For New NetWeaver", News Story, (Computerworld). http:www.computerworld.com/printthis/2004/0,4814,96558,00.html, (Oct. 11,2004), 1-2.

"Shared disk I/O cache", IP.COM Journal, IP.COM Inc., West Henrietta, XP013014199 ISSN: 1533-0001, (Jan. 29, 2004), 6.

"System and Method for Shared Memory/File System Java ObjectGroup Clustered JVM", http://www.priorartdatabase.com/IPCOM/000021597/, (Jan. 2004), 3.

Bryce, Ciaran, "Isolates: A New Approach to Multi-Programming in Java Platforms", LogOn Technology Transfer, Kronerg, Germany, Experts' Corner, (May 2004), 7.

Dandamudi, S. P., "Reducing Run Queue Contention in Shared Memory Multipocessors", Dandamudi, S.P., "Reducing Run Queue Contention in Shared Memory Multipocessors," IEEE pp. 82-89 (1997) XP000657329., (1997), 82-89.

Dillenberger, D., et al., "Building a java Virtual Machine For Serve Applications: The Jvm On Os/390", IBM Systems Journal, vol. 39, No. 1, (2000), 194-210.

Ferguson, Renee B., "SAP Preps New NetWeaver Capabilities", eWeek.com, http://www.eweek.com/article2/0,1759,1668146,00.asp, (Oct. 7, 2004), 1-6.

Jagannathan, et al., "High-Level Abstraction for Efficient Concurrent Systems", NEC Research Institute, Section 5.2, (Mar. 1994), 20., Section 5.2, (Mar. 1994), 20.

Jordan, Mick, et al., "Scaling J2EE Application Servers with the Multi-Tasking Virtual Machine", Paper, Sun Microsystems, SMLI TR-2004-135, Jun. 2004, pp. 1-19, Paper, Sun Microsystems, SMLI TR-2004-135, (Jun. 2004), 1-19.

Kuck, Norbert, et al., "SAP VM Container: Using Process Attachable Virtual machines to Provide Isolation and Scalability For Large Servers", Article, SAP AG, Walldorf, Germany, (2002), 1-2.

Loosco, Marcelo, et al., "A New Distributed Java Virtual Machine for Cluster Computing", Notes in Computer Science, Springer-Verlag, v. 2790, (2003), 1207-1215.

Parnas, Dagfinn, "SAP Virtual Machine Container", https://weblogs.sdn.sap.com/pub/wlg/940, (Oct. 23, 2004), 1-4.

Penchikala, Srini, "J2EE Object-Caching Frameworks", http://www.javaworld.com/javaworld/jw-05-2004/jw-0531-cache_p.html, (May 31, 2004), Whole Document.

Petev, Petio G., et al., "First in First Out Eviction Implementation", 6570P255 U.S. Appl. No. 11/024,546, filed Dec. 28, 2004, The Office Action mailed Apr. 6, 2007, claims as they stood in the application prior to the mailing of the Office Action an cl, (Dec. 28, 2004), Whole Document.

Smits, Thomas, "Unbreakable Java -The Java Server that Never Goes Down", Article, SAP TechED, Nov. 2004, San Diego and Munich, (Nov. 2004), 1-5.

Tanenbaum, A. S., "Multimedia Operating Systems", Tanenbaum, A.S., Modern Operating Systems, 2nd Edition, Upper Saddle River, New Jersey: Prentice-Hall, Inc., pp. 531-578 (2001). English Translation of: Moderne Betriebssyteme, vol. 2, pp. 539-617, (2002) XP002385695., (2002), 539-617.

Werner, Randolf, "Connection of Clients for Management of Systems", U.S. Appl. No. 11/026,604 filed Dec. 30, 2004.

Werner, Randolf, "Interface for External System Management", U.S. Appl. No. 11/027,812, filed Dec. 29, 2004.

Werner, Randolf, "Security for External System Management", U.S. Appl. No. 11/026,323, filed Dec. 29, 2004.

Wintergerst, Michael, et al., "Programming Models for Eviction Policies", U.S. Appl. No. 11/025,178, filed Dec. 28, 2004, The Office Action mailed Feb. 1, 2007, claims as they stood in the application prior to the mailing of the Office Action, (Dec. 28, 2004), Whole Document.

Yue, K. K., et al., "An Effective Processor Allocation Strategy for Multiprogrammed Shared-Memory Multiprocessors", Yue, K.K. and Lilja, D.J., "An Effective Processor Allocation Strategy for Multiprogrammed Shared-Memory Multiprocessors," IEEE 8(12):1246-1258, (1997)., (1997), 1246-1258.

White Paper: 'Using Rules-based Object Caching', spiritsoft / spiritcache 4.0 2004, (2004), 8.

""Desing Overview"", 2003 Sun Micosystems, http://java.sun.com.j2se/1.5.0/docs/guied/jni/spec/design/html, retrieved on Jan. 18, 2008.

"All Classes", http://www.jdocs.com/osche/2.0.2/api/com/opensymphony/oscache/base/allclases-frame.html, (Jan. 2004), 1.

"Class AbstractCacheAdministrator", http://www.jdocs.com/osche/2.0.2/api/com opensymphony/oscache/base/AbstractCache.html, (Jan. 2004), 1-11.

"Class Cache", http://www.jdocs.com/osche/2.0.2/api/com/opensymphony/oscache/base/Cache.html, (Jan. 2004), 1-6.

"Class CacheEntry", http://www.jdocs.com/osche/2.0.2/api/com opensymphony/oscache/base/CacheEntry.html, (Jan. 2004), 1-8.

"Class Config", http://www.jdocs.com/osche/2.0.2/api/com/opensymphony/oscache/base/Config.html, (Jan. 2004), 1-4.

"High Availability and Failover", SAP Library, http://help.sap.com/saphelp_nw04/helpdata/en/6c/209da105668c45be12f1d9cc412e2b/cont, (Nov. 2004), 1-2.

"Http Sessions and Failover of Web Application", SAP Library, http://help.sap.com/saphelp_nw04/helpdata/en/90/044c585eaba42b649f16181b0fdf/cont., (Nov. 2004), 1.

"Introducing Cache-Forward Architecture", ObjectStore, paper, (Jan. 1, 2004), 1-23.

"Java Technology in SAP Web Application Server", SAP Library, http://help.sap.com/saphelp_nw04/helpdata/en/0d/a3bbeff62847ae10000000a114084/cont, (Nov. 2004), 1-3.

"Java VineetB-log.java", http://homepage.mac.com/vineetb/iblog/C684524823/, (Dec. 18, 2003), 1.

"JCS Plugin Overview", http://jakarta.apache.org/jcs/Plugins.html, (Jun. 2004), 2.

"JSR 107: JCACHE-Java Temporary Caching API", http://.jcp.org/en/jsr/detail!id=107, (Mar. 20, 2001), 5.

"Load Balancing of the SAP Web As for Java Applications", SAP Library, http://help.sap.com/saphelp_nw04/helpdata/en/b5/e8239ef7bd494f896a84625d4b688f/cont., (Nov. 2004), 2.

"Managers—Intro", http://db.apache.org/torque-32/managers-cache.html, (Apr. 11, 2002), 1-4.

"Open Source Cache Solutions in Java", http://java-source.net/open-source/cache-solutions, (Nov. 2004), 1-3.

"OSCache", http://www.opensymphony.com/oscache, (Nov. 2004), 1.

"OSCache, V 2.0.2 API Specification", http://www.jdocs.com/osche/2.0.2/api/com/opensymphony/oscache/base/overview-sum.html, (Jan. 2004), 2.

"SAP NetWever Makes Standard Java Robust", http://www.sap.com/company/press/press.epx?pageview=print&pressid=3069, (Oct. 5, 2004), 1-2.

"SAP Presents New Capabilities for Netweaver", *InfoWorld*, http://www.infoworld.com/article/04/10/06/HNsapnetweaver_1.html, (Oct. 6, 2004), 1-5.

"spiritcache", http://www.spirit-soft.com/index.do?id=30, (Nov. 2004), 1.

"turbine-jcs-dev", http://www.mail-archive.com/turbine-jcs-dev@jakarata.apache.org/msg00647.html, (Jul. 13, 2004), 1-3.

"WebLogic RMI Features and Guidelines", *eDocs*, http://e-docs.bea.com/wls/docs90/rmi/rmi_api.html, (Nov. 2004), 1-7.

"What is LDAP?", http://www.gracion.com/server/whatldap.html, (Dec. 7, 2004).

Barrett, Ryan , "P4 Protocol Specification", (Sep. 2001), 1-12.

Bortvedt, Jerry , "Functional Specification for Object Caching Service for Java (OCS4J), 2.0", (Aug. 9, 2000), pp. 1-27.

Casavant, T. L., et al., ""A Taxonomy of Scheduling in General-Purpose Distributed Computing Systems"", *Casavant, T.L., and Kuhl, J.G., "A Taxonomy of Scheduling in General-Purpose Distributed Computing Systems," IEEE* 14(2):141-154, (1988) XP000039761., (1988), 141-154.

Conte, Thomas , "Implementing OSCache", http://www.pas.net/tom/articles/oscache/en/, (Jun. 2002), 1-4.

Czajkowski, Grzegorz , et al., "A Multi-User Virtual Machine", *Paper, Sun Microsystems Laboratories and S3 Lab, Purdue University,* West Lafayette, IN, (2003), 14.

Czajkowski, Grzegorz , "Multitasking without Compromise: A Virtual Machine Evolution", *Paper, Sun Microsystems Laboratories*, (2001), 1-14.

Davies, Robert , "Data Caching: A Prerequisite to the Enterprise Service Bus", *Business Integration Journal*, (Oct. 2003), 41-44.

Doyle, Patrick , et al., "A Modular and Extensible JVM Infrastructure", *Paper, Edward S. Rogers Sr. Department of Electrical and Computer Engineering, University of Toronto,* Toronto, Ontario, Canada, (Jul. 2002), 14.

Gontmakher, Alex , et al., "Characterizations for Java Memory Behavior", *Paper, Computer Science Department, Technion,* (1997), 5.

Handy, Jim , "The Cache Memory Book", 1998, *Academic Press Inc, 2nd Edition*, pp. 60, (1998), vii-229.

Hennessy, John , et al., "Computer Organization and Design ", *Morgan Kaufmann Publishers Inc., 2nd Edition*, (1998), 575-576.

Jordan, Mick , et al., "Extending a J2EE Server with Dynamic and Flexible Resource Management", *Paper, Sun Microsystems, Inc, and School of Computer Science, University of Waterloo,* Waterloo, ON, Canada, (Oct. 2004), 20.

Luck, Greg , "Ehcache 1.0 released", http://www.theserverside.com/news, (Oct. 9, 2004), 1-5.

March, Andres , "OSCache: Change Log", http://www.opensymphony.com/oscache/wiki/Change%20Log.html, (Jan. 18, 2004), 1-11.

Marinescu, Floyd , "SpiritSoft Announces Availability of SpiritCache 2.0", http://www.theserverside.com/news/thread.tss?thread_id=18483, (Mar. 21, 2003), 1-5.

Movva, Sudhir , et al., "Transparent Clustered Database Failover Using JAVA", http://www.quest-pipelines.com/newsletter-v5/0604_A.html, (Apr. 2004), 11.

Oetiker, Tobias , "SEPP Software Installation and Sharing System", *Proccedings of the Twelfth Systems Administration Conference (LISA '98),* Boston, Massachusetts, (Dec. 6-11, 1998), pp. 253-260.

Pasin, Marcia , et al., "High-Available Enterprise JavaBeans Using Group Communication System Support", Pasin et al., "High-Available Enterprise JavaBeans Using Group Communication System Support", pp. 1-6, XP002285985., 1-6.

Penchikala, Srini , "Object Caching in a Web Portal Application Using JCS", http://www.onjava.com/pub/a/onjava/2003/caching.html, (Dec. 23, 2003), 1-18.

Salo, Timo , et al., "Object Persistence Beyond Serialization", *Increasing Productivity and Reducing Maintenance, Dr. Dobb's Journal, M7T Publ.,* vol. 24, No. 5, XP000925486. ISSN: 1044-789X., (May 1999), 5.

Salo, Timo , et al., "Persistence in Enterprise JavaBeans Applications", *JOOP*, XP002142904., (Jul. 1999), 3.

Srinivasan, V. , et al., "Object Persistence in Object-Oriented Applications", *IBM Systems Journal, IBM Corp.,* vol. 36, No. 1, 1997, pp. 11, XP000685709, ISSN: 0018-8670.

Stark, "Concurrent Programming In Java", *CS2 Advanced Programming in Java note 9, S2Bh*, (Jan. 3, 2002), 1-5.

Tullman, Patrick , et al., "Janos: A Java-Oriented OS for Active Network Nodes", *Paper, Flux Research Group, University of Utah,* (Mar. 2001), 14.

Tuttle, Steven , et al., "Understanding LDAP Design and Implemenation", IBM.com Redbooks, (Jun. 2004), 1-774.

"FOA Mailed Aug. 13, 2008 for U.S. Appl. No. 11/013,278, Whole Document", (Aug. 13, 2008).

Cheung, KC , et al., "Lightweight Trace and Interpreter for Interprocess Timing Problems", *IP.COM Journal, IP.COM Inc.,* West Henrietta, NY US, XP013096988, ISSN: 1533-0001, (Jun. 1, 1992), Whole Document.

EPO, "EP EP Search Report Mailed Jun. 4, 2008 for EP Patent Application 05027365.5-1225", (Jun. 4, 2008), Whole Document.

Galchev, Galin , "Plug-In Based Caching Architecture Capable Of Implementing Multiple Cache Regions Per Application", U.S. Appl. No. 11/024,554, filed Dec. 28, 2004, Non-Final Office Action mailed May 28, 2008, 7 pgs.

Galchev, Galin , et al., "Plug-In Based Caching Architecture Capable Of Implementing Multiple Cache Regions Per Application", U.S. Appl. No. 11/024,554, filed Dec. 28, 2004.

Petev, Petio , et al., "Common Cache Management in a Plurality of Virtual Machines", U.S. Appl. No. 11/025,482, filed Dec. 28, 2004.

Petev, Petio , et al., "First In First Out Eviction Implementation", U.S. Application 11/024,546, filed Dec. 28, 2004.

Petev, Petio G., et al., "Programming Models for Storage Plug-Ins", U.S. Appl. No. 11/024,651, filed Dec. 28, 2004.

Petev, Petio , et al., "Size Based Eviction Implementation", U.S. Appl. No. 11/024,591, filed Dec. 28, 2004.

USPTO, "FOA Mailed Sep. 17, 2008, for U.S. Appl. No. 11/024,392", filed Sep. 17, 2008, Whole Document.

Viswanathan, D. , et al., "Java Virtual Machine Profiler Interface", *IBM Systems Journal IBM USA*, vol. 39, No. 1, XP002481425, ISSN: 0018-8670, (2000), 82-95.

Wintergerst, Michael , "Storage Plugin Based on Shared Closures", U.S. Appl. No. 11/024,613 filed Dec. 28, 2004.

Wolczko, Mario , "Using a Tracing Java Virtual Machine to Gather Data on the Behavior of Java Programs", *Internet Citation*, XP002375976, http://research.sun.com/people/mario/tracing-jvm/tracing.pdf, (Retrieved on Apr. 6, 2006), Whole Document.

Non-Final Office Action for U.S. Appl. No. 11/013,278, Mailed Dec. 23, 2008, 28 pages.

Non-Final Office Action for U.S. Appl. No. 11/012,803, Mailed Dec. 23, 2008, 22 pages.

\* cited by examiner

VIRTUAL MACHINE MONITORING USING SHARED MEMORY

TECHNICAL FIELD

This disclosure relates generally to virtual machines, and in particular but not exclusively, relates to monitoring java virtual machines.

BACKGROUND INFORMATION

Enterprise software has transformed the way diverse enterprises, large and small a like, transact and manage day-to-day operations. Businesses use enterprise software (e.g., web based application servers) to control production planning, purchasing and logistics, warehouse management and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP NetWeaver, SAP xAPPs, mySAP Business Suite, etc.).

To integrate diverse hardware and software resources, developers of enterprise software have leveraged cross platform engines capable of minimizing or even severing platform dependencies from the enterprise solution. The Java 2 Platform, Enterprise Edition™ ("J2EE") (e.g., J2EE Specification, Version 1.4) is a Java based solution supported by the Java Virtual Machine ("JVM") engine. J2EE simplifies application development and decreases the need for programming and programmer training by creating standardized and reusable modular components. The popularity of Java based solutions is evident as the Information Technology ("IT") world has gravitated to the Java language.

As enterprise software is woven into the fabric of modern business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently, JVMs do not provide adequate tools to monitor their internal operation on a real-time basis.

SUMMARY OF INVENTION

A system and method to monitor a virtual machine ("VM") is described. The VM executes one or more applications. During executing of the one or more applications, local objects are created and stored within an internal heap maintained by the VM. Status data of the internal heap is published to monitoring memory external to the VM. In one embodiment, the VM is a Java VM ("JVM").

When memory of the internal heap becomes scarce, one or more of the local objects may be garbage collected. Garbage collecting data can be copied into the monitoring memory, as one type of the status data.

In one embodiment, multiple JVMs may each execute one or more Java applications. Shared objects created during execution of these Java applications may be stored into a shared heap that is maintained external to the multiple JVMs. Shared status data regarding the shared heap may also be copied into the monitoring memory.

In an embodiment with multiple JVMs, shared classes may be loaded during execution of the Java applications and stored within the shared heap. These shared classes may be used to instantiate the shared objects.

In one embodiment, the status data stored in the monitoring memory may be retrieved in response to receiving a status query, and the status data transmitted to a monitoring console to display the status data.

Embodiments of the invention may include all or some of the above described features. The above features can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for monitoring java virtual machines ("JVMs") using shared monitoring memory are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
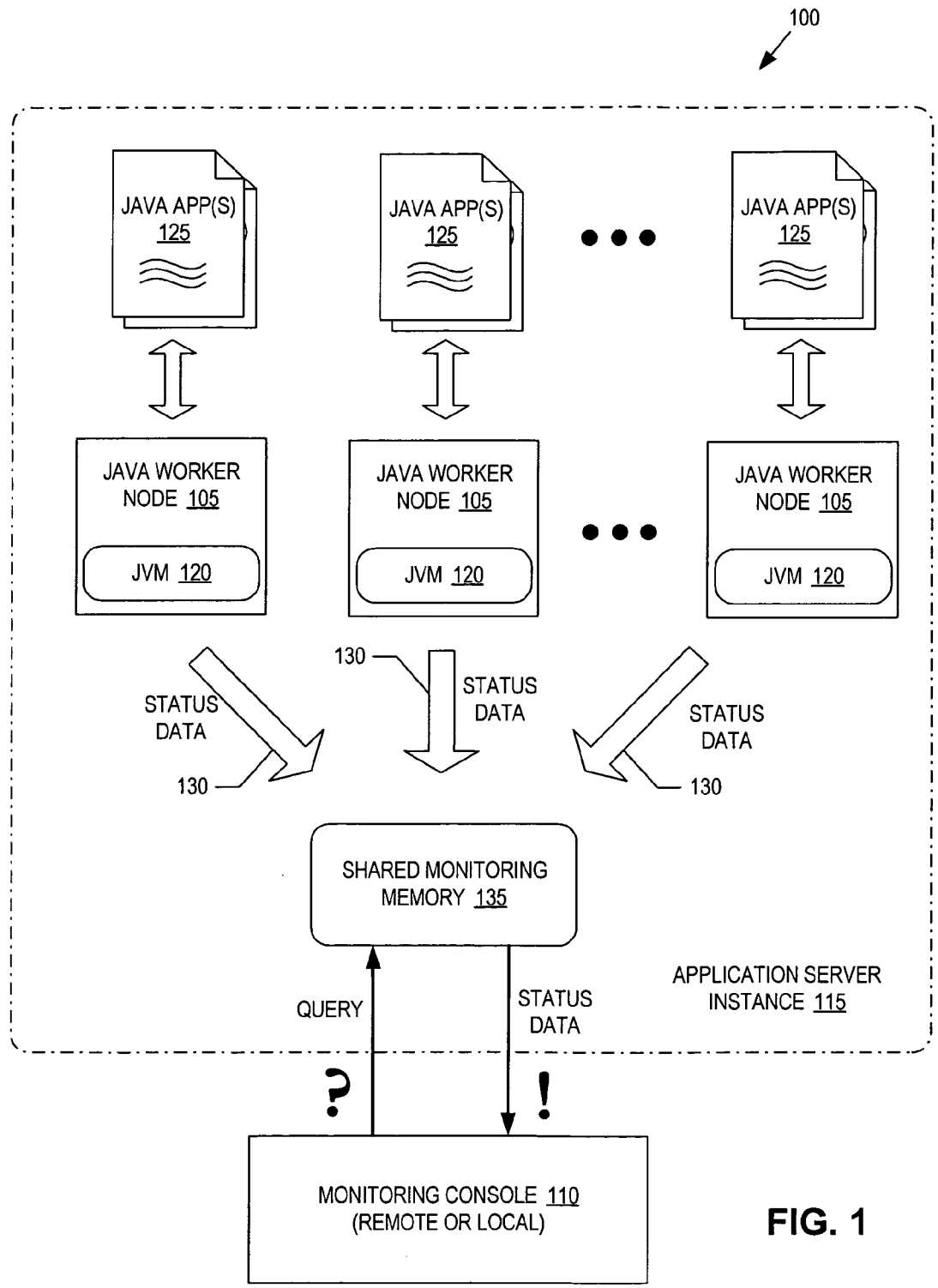
FIG. 1 is a block diagram illustrating a software system for monitoring the health of Java worker nodes from a monitoring console, in accordance with an embodiment of the invention.

FIG. 1 is a block diagram illustrating a software system 100 for monitoring the health of Java worker nodes 105 from a monitoring console 110, in accordance with an embodiment of the invention. In the illustrated embodiment, software system 100 includes an application server ("AS") instance 115 and monitoring console 110. AS instance 115 includes one or more Java worker nodes 105 each providing the runtime environment for a Java virtual machine ("JVM") 120, which in turn interprets/executes Java applications 125. Although the embodiments illustrated herein are described in connection with the Java programming language and JVMs, it should be appreciated that these techniques may be extended to other types of virtual machines and interpreted languages by those of ordinary skill in the art having the benefit of the instant disclosure.

Collectively, Java applications 125 may provide the logic for implementing various sub-layers (e.g., business layer, integration layer, presentation layer, etc.) of AS instance 115. In one embodiment, AS instance 115 is a web application server, such as Web AS by SAP, .NET by Microsoft, or the like. It should be appreciated that various components of AS instance 115 have been excluded from FIG. 1 for the sake of clarity and so as not to obscure the invention.

In one embodiment, Java applications 125 include compiled bytecode to be verified and interpreted by JVMs 105. For example, Java applications 125 may be servlets providing server-side logic to generate graphical user interfaces ("GUIs") on remote clients and may further include JavaServer Page ("JSP") extensions for providing dynamic content within the GUI. Java applications 125 may include business applications providing the business logic of an Enterprise JavaBean ("EJB"), applets providing client side logic, and the like.

During execution of Java applications 125, Java worker nodes 105 publish status data 130 to shared monitoring memory 135. Status data 130 includes operational health data of the internal workings of JVMs 120. This operational health data may include statistical data detailing heap utilization, garbage collecting activity, and the like. Once status data 130 is published to shared monitoring memory 135, monitoring console 110 can query shared monitoring memory 135 to display status data 130 for review by an Information Technology ("IT") technician. Monitoring console 110 may be located locally on the same hardware machine executing AS instance 115, or advantageously, executed on a remote machine coupled to a network. Monitoring console 110 may further monitor an entire cluster of AS instances 115, all from a single remote machine.

Figure 2:
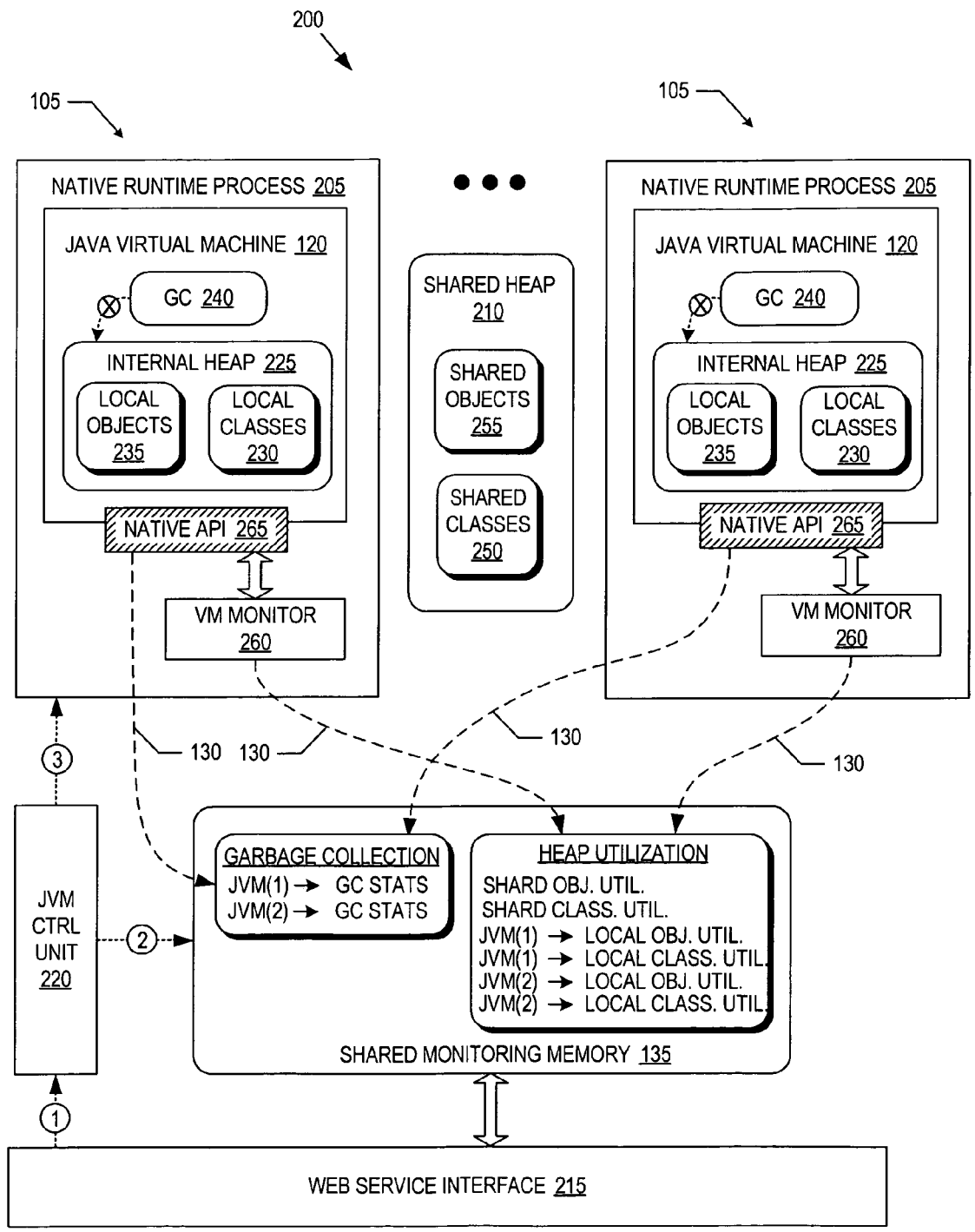
FIG. 2 is a block diagram illustrating a software environment of an application server instance implemented with shared monitoring memory for monitoring Java virtual machines, in accordance with an embodiment of the invention.

FIG. 2 is a block diagram illustrating a software environment 200 of AS instance 115 implemented with shared monitoring memory 135 for monitoring the internal workings of JVMs 120, in accordance with an embodiment of the invention. The illustrated embodiment of software environment 200 includes native runtime processes 205, shared heap 210, shared monitoring memory 135, web service interface 215, and JVM control unit 220. Each native runtime process 205 provides the runtime environment for a single JVM 120. Together, a native runtime process 205 and a JVM 120 form a Java worker node 105. In a J2EE environment, JVM control unit 220 is often referred to as "JControl."

The components of software environment 200 interact as follows. In one embodiment, web service interface 215 is loaded first. Web service interface 215 provides interface capabilities for the components of software environment 200 to communicate across an attached network. In one embodiment, web service interface 215 can be launched remotely from a command console. In a Java 2 Platform, Enterprise Edition ("J2EE") environment, web service interface 215 is known as the WebService Based Start Service.

Once loaded and operating, web service interface 215 launches JVM control unit 220. In turn, JVM control unit 220 reserves and allocates memory to establish shared monitoring memory 135. Subsequently, JVM control unit 220 launches each native runtime process 205 to provide the runtime environments for JVMs 120. JVM control unit 220 is responsible for the life cycles of each native runtime process 205. JVM control unit 220 can launch a new native runtime process 205, terminate an existing native runtime process 205 at an end of its useful life cycle, or restart a hung, or otherwise problematic, native runtime process 205.

In one embodiment, web service interface 215, JVM control unit 220, and native runtime processes 205 are operating system ("OS") runtime processes managed by the OS runtime environment. In one embodiment, web service interface 215, JVM control unit 220, and native runtime processes 205 are native machine code, such as compiled C++.

Upon commencement of a new native runtime process 205, the new native runtime process 205 will establish a new JVM 120 therein. During operation, each Java worker node 105 is assigned user requests by a dispatcher (not illustrated), services user sessions, and executes/interprets Java applications 125 on JVMs 120. Each JVM 120 establishes an internal heap 225 as a pre-reserved memory pool for future use by Java applications 125 as they are loaded. Internal heaps 225 are managed by each JVM 120 allocating and deallocating memory as is required by Java applications 125.

Java applications 125 include objects and classes. Objects and classes that are local or private only to a particular Java worker node 105 and not shared with other Java worker nodes 105 within AS instance 115 are called local classes 230 and local objects 235. When Java applications 125 are loaded and executed by JVM 120, local classes 230 and local objects 235 are stored within internal heaps 225 for use by Java applications 125 running on a single JVM 120. Classes include methods that perform tasks and return information when they complete those tasks. Objects are essentially reusable software components that model pieces of software programs in terms of properties and behaviors. Classes are used to instantiate an object with these properties and behaviors. In other words, local objects 235 inherit their properties and behaviors from the particular local class 230 used to instantiate (e.g., create) the particular local object 235.

As Java applications 125 consume internal heaps 225 by filling them with local classes 230 and local objects 235, memory within internal heaps 225 available to accept new local classes or new local objects may become scarce. As such, each JVM 120 includes a garbage collector 240 to implement a disciplined procedure for returning consumed resources back to the particular internal heap 225. In one embodiment, garbage collector 240 is a thread automatically executed by JVM 120 to reclaim dynamically allocated memory without explicit instructions to do so by the programmer of Java applications 125. When there are no more references to a local object 235 within internal heap 225, the particular local object 235 is marked for garbage collection.

The memory consumed by the marked local object 235 is then reclaimed when garbage collector 240 executes. Performing regular garbage collection when available memory within internal heap 225 becomes scarce helps avoid resource leaks.

However, when available memory within internal heap 225 becomes scarce, performance of the particular Java worker node 105 suffers due to the garbage collecting activities. In practice, if internal heap 225 exceeds 80% capacity, garbage collecting activities of garbage collector 240 may result in the productive computing output of the particular Java worker node 105 grinding to a near halt. Although garbage collector 240 is relatively good at deleting unreferenced local objects 235 to reclaim consumed memory, not all idle local objects 235 are reclaimed for a variety of reasons. As such, the older a particular Java worker node 105 happens to be, the more likely that Java worker node 105 is to suffer from chronic garbage collecting activity.

Not all objects utilized by Java applications 125 are local to the particular Java worker node 105. In one embodiment, shared heap 210 stores shared classes 250 and shared objects 255 utilized by Java applications 125 executing on multiple Java worker nodes 105. Shared heap 210 is a memory pool external to JVMs 120 and accessible by Java applications 125 executing on multiple JVMs 120. In this embodiment, the first Java application 125 to instantiate and use a shared object 255, places the new shared object 255 into shared heap 210. Subsequently, other Java worker nodes 105 and Java applications 125 can use the shared object 255 without expensing time and computing resources to create the particular shared object 255. Sharing classes and objects within shared heap 210 not only saves computing time that would otherwise be consumed to create the same object multiple times, it also conserves available memory within internal heaps 225, since a single instance of a shared object 255 can replace multiple instances of the very same local object within multiple internal heaps 225.

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 3:
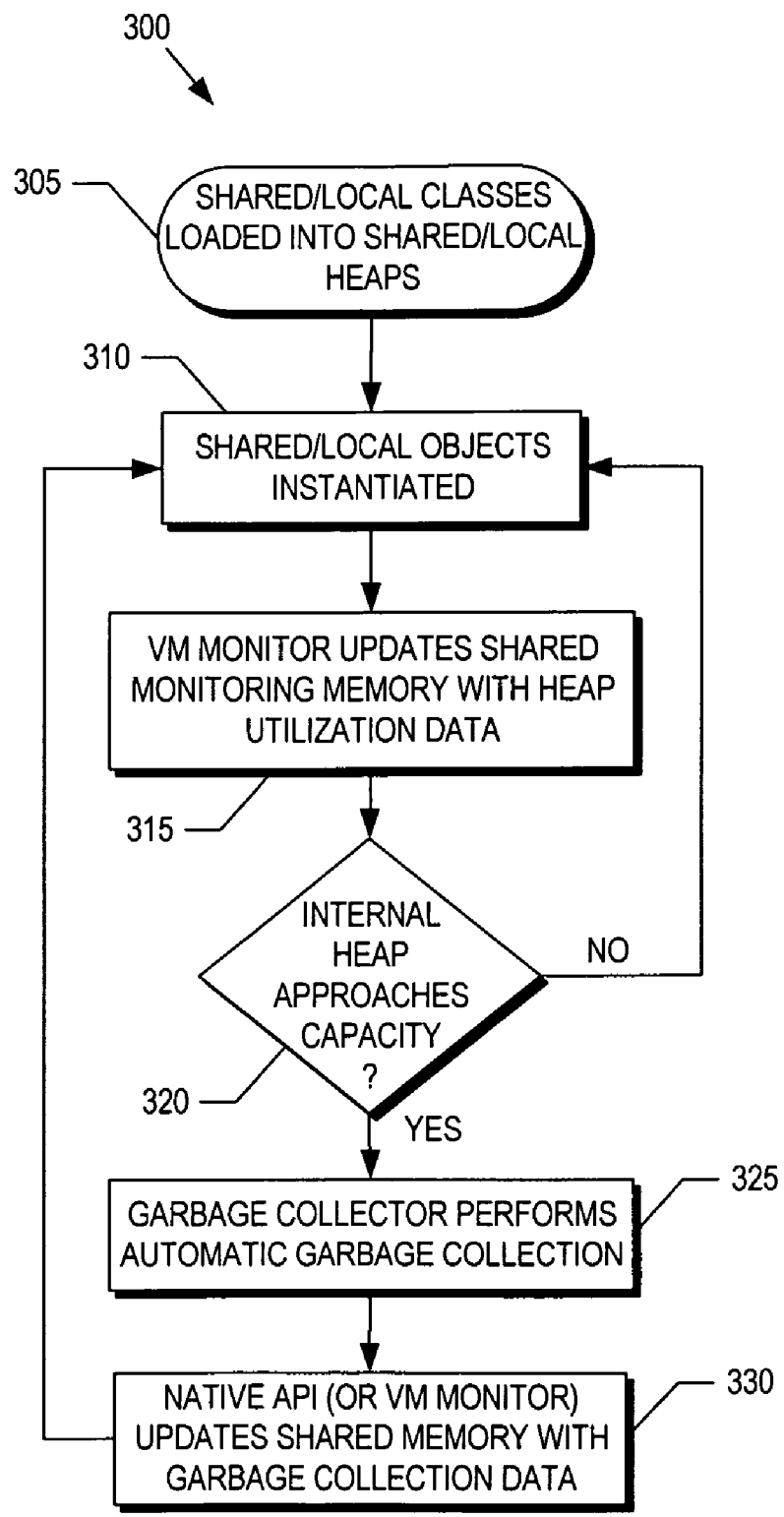
FIG. 3 is a flow chart illustrating a process for generating status data for one or more Java virtual machines and storing the status data within shared monitoring memory, in accordance with an embodiment of the invention.

FIG. 3 is a flow chart illustrating a process 300 for generating status data 130 for one or more JVMs 120 and storing status data 130 within shared monitoring memory 135, in accordance with an embodiment of the invention. In a process block 305, Java applications 125 cause local classes 230 and shared classes 250 to be loaded into internal heaps 225 and shared heap 210, respectively. In a process block 310, local objects 235 are instantiated with local classes 230 and stored into internal heaps 225, while shared objects 255 are instantiated with shared classes 250 and stored into shared heap 210.

During operating of Java applications 125, shared monitoring memory 135 is updated with status data 130. Status data 130 may include a variety of information to monitor the internal workings of each JVM 120 in real-time (e.g., heap utilization statistics, garbage collecting statistics, etc.).

In a process block 315, a virtual machine ("VM") monitor 260 updates shared monitoring memory 135 with heap utilization data. In the illustrated embodiment, VM monitor 260 is a sub-component of native runtime process 205. As such, in the illustrated embodiment, VM monitor 260 is external to JVM 120 and not executed/interpreted thereon. To gain access to the internal structures of JVM 120, a native application programming interface ("API") 265 is provided by native runtime process 205. In one embodiment, native API 265 includes functions that can retrieve data from within JVM 120, such as from internal heap 225. VM monitor 260 calls the functions of native API 265, which return the requested data. In one embodiment, the functions may return utilization statistics of internal heap 225 (e.g., "hit rate" of various local objects, number of local objects, amount of internal heap consumed, available memory within internal heap, etc.). In response, VM monitor 260 copies/publishes the heap utilization data into shared monitoring memory 135. In one embodiment, VM monitor 260 may format/organize the heap utilization data prior to publishing it into shared monitoring memory 135. In one embodiment, VM monitor 260 updates shared monitoring memory 135 on a periodic basis (e.g., every 5 seconds or so).

As discussed above, during execution of Java applications 125, available memory within internal heap 225 may become scarce. If internal heap 225 approaches capacity (decision block 320), then process 300 continues to a process block 325. In process block 325, garbage collector 240 performs automatic garbage collection to delete unreferenced local objects 235 and reclaim the consumed memory within internal heap 225.

In a process block 330, shared monitoring memory 135 is updated with garbage collecting data in response to the garbage collection event in process block 325. In one embodiment, a callback function of native API 265 updates shared monitoring memory 135 with the garbage collection status data. Whenever a garbage collecting event occurs, JVM 120 invokes the callback function, which in turn makes a note of the garbage collecting event within shared monitoring memory 135. In yet another embodiment, the callback function transfers status data of the garbage collecting event to VM monitor 260, which in turn registers the garbage collecting event into shared monitoring memory 135. A history of garbage collecting events and related monitoring data may be saved concurrently within shared monitoring memory 135.

As discussed above, shared monitoring memory 135 is external to Java worker nodes 105. As such, shared monitoring memory 135 is insulated from Java worker nodes 105 in the event one or more of them crashes, hangs (e.g., enters an infinite loop), or otherwise fails. Accordingly, even if a JVM 120 crashes, the latest status data 130 just prior to the faulty JVM 120 going down is still available within shared monitoring memory 135. Vital information may be quickly obtained from shared monitoring memory 135 to determine the source of the error. In fact, this postmortem status data may already be displayed on monitoring console 110 for inspection by an IT technician without any additional effort to obtain it.

Figure 4:
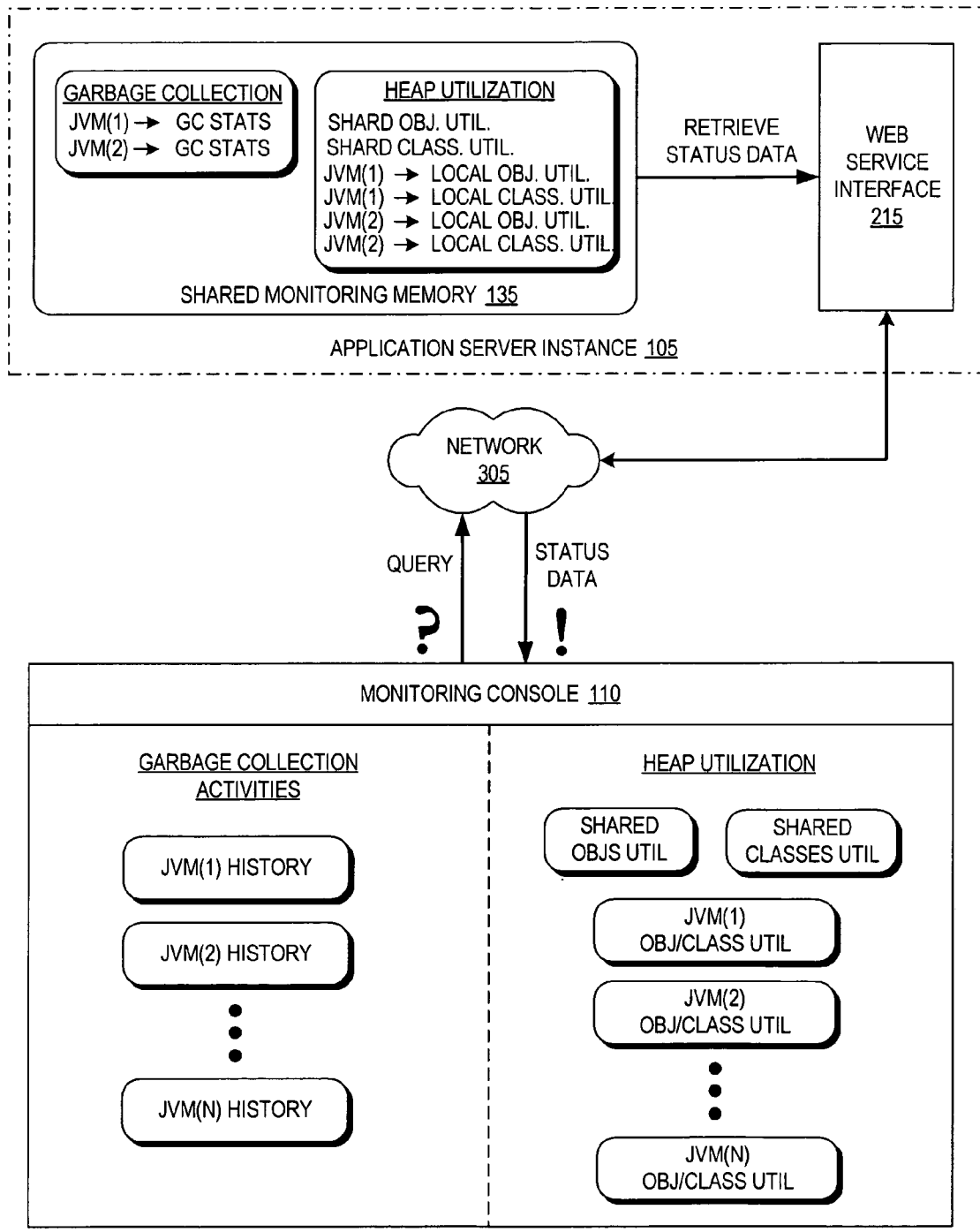
FIG. 4 is a block diagram illustrating a monitoring console for displaying status data of Java virtual machines communicated from an application server instance, in accordance with an embodiment of the invention.

FIG. 4 is a block diagram illustrating monitoring console 110 for displaying status data 130 retrieved from JVMs 120, in accordance with an embodiment of the invention. As illustrated, web service interface 215 is communicatively coupled to retrieve status data 130 from shared monitoring memory 135 and transmits this data across a network 305 (or other communication medium) to monitoring console 110. It should be appreciated that monitoring console 110 may execute on the same physical hardware as AS instance 105, in which case status data 130 would not need to be transmitted across network 305.

Figure 5:
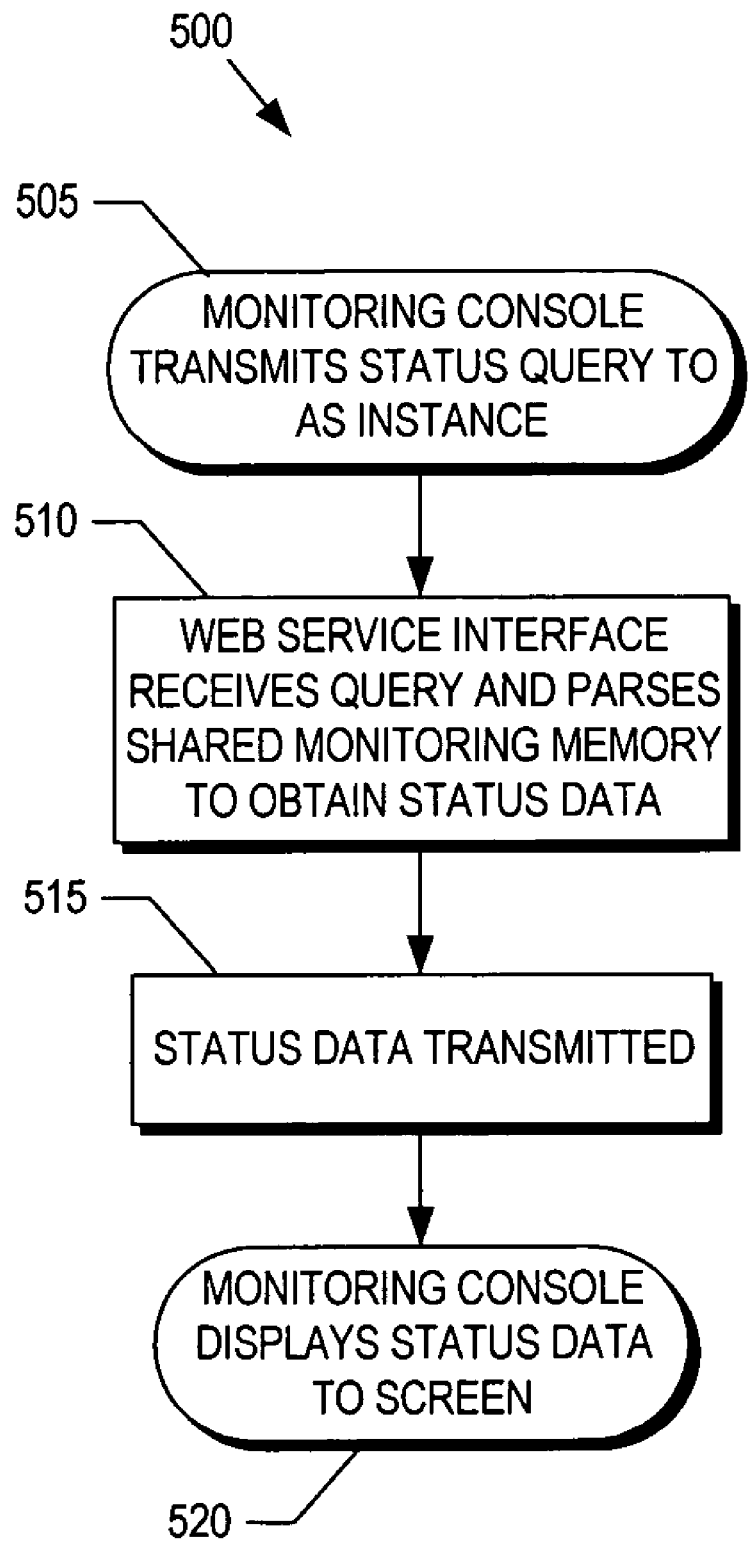
FIG. 5 is a flow chart illustrating a process for communicating status data stored within shared monitoring memory to a monitoring console, in accordance with an embodiment of the invention.

FIG. 5 is a flow chart illustrating a process 500 for communicating status data 130 from shared monitoring memory 135 to monitoring console 110, in accordance with an embodiment of the invention. In a process block 505, monitoring console 110 transmits a status query to AS instance 105. The status query may be transmitted to AS instance 105 automatically on a periodic basis, in response to a specified event, or in response to a screen refresh request by an IT technician.

In the illustrated embodiment, monitoring console 110 can display both garbage collection statistics and heap utilization statistics. The garbage collecting activities of multiple JVMs 120 can be displayed at once. The garbage collecting monitoring data displayed may include a recent history for each JVM 120, while outputting long term records to log files. The garbage collecting monitoring data may include: amount of currently available memory within each internal heap 225, percentage of currently available memory, amount of consumed memory within internal heap 225, percentage of consumed memory within internal heap 225, absolute amount of available memory, start and stop time/date of each garbage collecting event, duration of each garbage collecting event, and the like.

The heap utilization monitoring data displayed may include: shared class utilization, shared object utilization, local class utilization, and local object utilization for each JVM 120. In one embodiment, the heap utilization data may simply be a snap shot of the most recent utilization statistics or include a recent history of the utilization statistics. The utilization data displayed may include hit rates, number of objects/classes currently residing in each heap, last time each object/class was utilized, and the like. The utilization statistics may also be output to a log file.

Furthermore, monitoring console 110 may display and monitor multiple AS instances 105 coupled to network 305. In this embodiment, monitoring console 110 may include multiple panels, tabs, or windows associated with each AS instance 105 and output long term records to separate log files for each AS instance 105.

In a process block 510, web service interface 215 receives the status query and parses shared monitoring memory 135 to retrieve the requested status data. In response, the retrieved status data is transmitted to monitoring console 110 (process block 515) and displayed by monitoring console 110 to a screen for inspection by a user, such as an IT technician or the like (process block 520).

In one embodiment, web service interface 215 and monitoring console 110 may negotiate a reporting contract dictating that web service interface 215 is to periodically update monitoring console 110 with status data 130 without need of first transmitting the status query (process blocks 505 and 510). In this case, web service interface 215 pushes status data 130 to monitoring console 110, as opposed to monitoring console 110 pulling status data 130 from web service interface 215.

Figure 6:
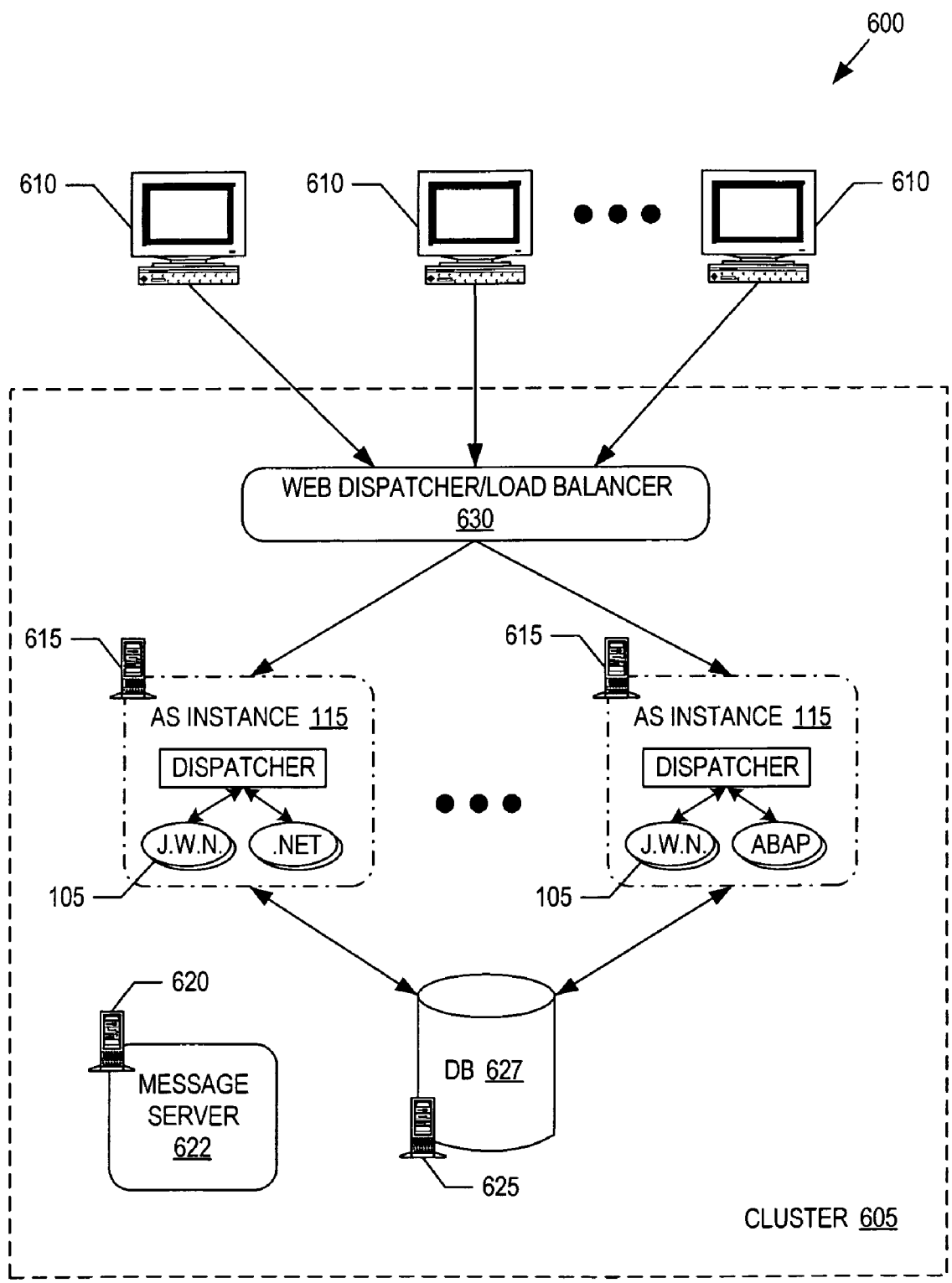
FIG. 6 is a block diagram illustrating a demonstrative enterprise environment for implementing embodiments of the invention.

FIG. 6 is a block diagram illustrating a demonstrative enterprise environment 600 for implementing embodiments of the invention. The illustrated embodiment of enterprise environment 600 includes a cluster 605 coupled to service requests from client nodes 610. Cluster 605 may include one or more server nodes 615 each supporting one or more AS instances 105, a message server node 620 supporting a message server 622, a database node 625 supporting a database 627, and a web dispatcher 630.

Web dispatcher 630 implements a load-balancing mechanism distributing service requests from client nodes 610 among server nodes 615 within cluster 605. For example, web dispatcher 630 may implement a round-robin load-balancing mechanism or the like. Web dispatcher 630 may be one of server nodes 615 having the task of dispatching service requests among server nodes 615 of cluster 605 or a stand alone hardware node. The service requests are processed by server nodes 615 and subsequently provided to database nodes 625. Database nodes 625 offer up the requested data to server nodes 615, which in turn process and format the results for display on client nodes 610.

Eash AS instance 105 may further include its own dispatcher mechanism to distribute the requests assigned to it among its individual Java worker nodes 105. In one embodiment, Java worker nodes 105 are based on J2EE. AS instances 105 may further include other types of worker nodes including those based on the Microsoft .NET standard, the Advanced Business Application Programming ("ABAP") standard developed by SAP AG, and the like.

One of client nodes 610 may execute monitoring console 110 to provide remote monitoring of AS instances 115, and in particular, remote monitoring of each worker node (including Java worker nodes 105, .NET worker nodes, and ABAP worker nodes). If an IT technician notices that one of the worker nodes has a low heap utilization, overactive garbage collection activity, or the like, the IT technician can take appropriate action including resetting the problematic worker node. Alternatively, scripts may run in concert with monitoring console 110 on a client node 610 to automatically address a problematic worker node based on a predefined response policy.

Figure 7:
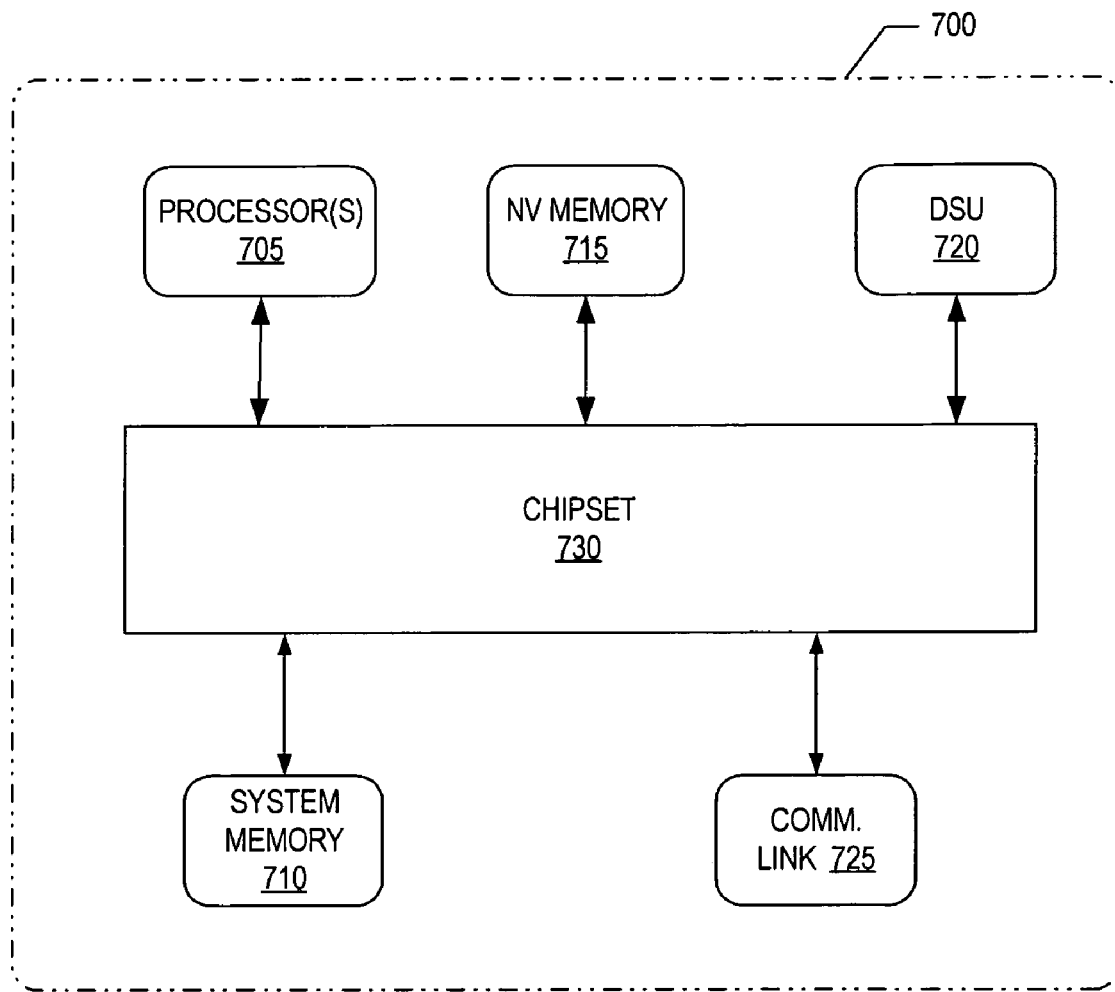
FIG. 7 illustrates a demonstrative processing system for implementing embodiments of the invention.

FIG. 7 is a block diagram illustrating a demonstrative processing system 700 for executing any of AS instance 115, software environment 200, monitoring console 110, or implementing any of client nodes 610, server nodes 615, message server node 620, or database node 625. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network (e.g., network 305) such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card, additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method, comprising:
    implementing at a server node in a network of nodes an application server instance having a virtual machine control unit;
    launching with the virtual machine control unit at least two worker nodes within the application server instance, each of the at least two worker nodes providing a respective run-time environment;
    in each of the respective run-time environments of the at least two worker nodes,
        executing a respective virtual machine ("VM") and a respective virtual machine monitor for the respective VM, and
        running by the respective VM a respective application, including storing a local object within a respective heap internal to and maintained by the VM;
    one of the virtual machines ("VMs") instantiating a data object in a shared heap of the application server instance external to the at least two worker nodes and accessible by the VMs of the at least two worker nodes; and
    publishing status data to a monitoring memory of the application server instance external to and shared by the at least two worker nodes and the shared heap, wherein the monitoring memory is accessible to a monitoring console configured to display the published status data, the published status data including
        data specifying a utilization of the shared heap, and
        for each of the plurality of worker nodes,
            data specifying a utilization of the internal heap of the respective VM, and
            data specifying a history of garbage collecting events of the internal heap of the respective VM.

2. The method of claim 1, wherein the respective VMs of the at least two worker nodes comprise a Java VM ("JVM") and wherein the application run by the JVM includes a Java application.

3. The method of claim 1, wherein publishing the status data comprises:
    accessing an internal heap through a native application programming interface ("API");
    retrieving the status data of the accessed internal heap by a VM monitor executed within the respective worker node of the accessed internal heap; and
    copying the status data retrieved by the VM monitor to the monitoring memory.

4. The method of claim 3, wherein one of the VM monitors of the at least two worker nodes comprises native machine code.

5. The method of claim 2, further comprising:
    garbage collecting at least one of the local objects maintained within the internal heap of the JVM when available memory of the internal heap is scarce; and
    registering the garbage collecting with the monitoring memory.

6. The method of claim 1, wherein the shared status data includes at least one of shared object utilization data, shared class utilization data, and shared heap garbage collecting activity.

7. The method of claim 1, further comprising:
    retrieving the status data from the monitoring memory; and
    transmitting the status data to the monitoring console to display the status data.

8. The method of claim 1, wherein the monitoring memory is isolated from the respective VMs of the at least two worker nodes to provide access to the status data published to the monitoring memory in the event one of the VMs fails.

9. A computer-readable storage medium having stored thereon instructions that, if executed by a machine, will cause the machine to perform operations comprising:
    implementing at a server node in a network of nodes an application server instance having a virtual machine control unit;
    launching with the virtual machine control unit at least two worker nodes within the application server instance, each of the at least two worker nodes providing a respective run-time environment;
    in each of the respective run-time environments of the at least two worker nodes,
        executing a respective java virtual machine ("JVM") and a respective virtual machine monitor for the respective JVM, and
        running by the respective JVM a respective application, including storing local objects within a corresponding internal heap internal to and maintained by the corresponding JVM;
    one of the java virtual machines ("JVMs") instantiating a data object in a shared heap of the application server instance external to the at least two worker nodes and accessible by the JVMs of the at least two worker nodes; and
    publishing status data to a monitoring memory of the application server instance external to and shared by the at least two worker nodes and the shared heap, wherein the monitoring memory is accessible to a monitoring console configured to display the published status data, the published status data including
        data specifying a utilization of the shared heap, and
        for each of the plurality of worker nodes, data specifying a utilization of the internal heap of the respective JVM, and
data specifying a history of garbage collecting events of the internal heap of the respective JVM.

10. The computer-readable storage medium of claim 9, wherein publishing the status data comprises:
accessing an internal heap through a native application programming interface ("API");
retrieving status data of the accessed internal heap by a VM monitor executed within the respective worker node of the accessed internal heap; and
copying the status data retrieved by the VM monitor to the shared monitoring memory.

11. The computer-readable storage medium of claim 9, further providing instructions that, if executed by the machine, will cause the machine to perform further operations, comprising:
garbage collecting at least one of the local objects maintained within the internal heap of one of the plurality of JVMs when available memory of the internal heap is scarce; and
in response to the garbage collecting, publishing garbage collecting monitoring data to the shared monitoring memory.

12. The computer-readable storage medium of claim 9, wherein the status data comprises at least one of shared object utilization data, shared class utilization data, and shared heap garbage collecting data.

13. A system, comprising:
a server node to execute an application server ("AS") instance, the AS instance including logic executable by a processor of the server node to:
launch with a virtual machine control unit at least two worker nodes within the AS instance, each of the at least two worker nodes providing a run-time environment;
in each of the respective run-time enviromnents of the at least two worker nodes,
execute a respective java virtual machine ("JVM") and a respective virtual machine monitor for the respective JVM, and
run by the respective JVM a respective application, including storing local objects within a corresponding internal heap internal to and maintained by the corresponding JVM;
instantiate with one of the java virtual machines ("JVMs") a data object in a shared heap of the AS instance external to the at least two worker nodes and accessible by the JVMs of the at least two worker nodes; and
publish status data to a monitoring memory of the application server instance external to and shared by the at least two worker nodes and the shared heap, wherein the monitoring memory is accessible to a monitoring console configured to display the published status data, the published status data including
data specifying a utilization of the shared heap, and
for each of the plurality of worker nodes,
data specifying a utilization of the internal heap of the respective JVM, and
data specifying a history of garbage collecting events of the internal heap of the respective JVM.

14. The system of claim 13, wherein the logic is further to:
garbage collect at least one of the local objects maintained within the internal heap of one of the plurality of JVMs when available memory of the internal heap is scarce; and
wherein the publishing the status data to the shared monitoring memory is in response to the garbage collecting event.

15. The system of claim 14, further comprising:
a client node to execute the monitoring console, the client node communicatively coupled to the server node, the monitoring console including logic executable by a processor of the client node to:
receive the status data from the server node; and
display the status data to a screen of the client node.

16. The system of claim 15, wherein the monitoring console further includes logic executable by the processor of the client node to monitor a cluster of AS instances.

* * * * *